United States Patent

Kamei

[19]

[11] Patent Number: 5,950,208
[45] Date of Patent: *Sep. 7, 1999

[54] HYPER TEXT SYSTEM AND ITS DISPLAY METHOD

[75] Inventor: Yoichi Kamei, Chofu, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/627,017

[22] Filed: Apr. 3, 1996

[30] Foreign Application Priority Data

Apr. 7, 1995 [JP] Japan ................................. 7-082498

[51] Int. Cl.⁶ ..................................................... G06F 17/21
[52] U.S. Cl. .......................................................... 707/203
[58] Field of Search ........................... 395/326, 618–619, 395/761, 772, 776–778, 784, 785, 788, 790–793; 345/326; 707/202, 203, 511, 514–516, 526, 528–529

[56] References Cited

U.S. PATENT DOCUMENTS

| 4,807,182 | 2/1989 | Queen | 395/772 |
| 5,159,699 | 10/1992 | Trigg et al. | 395/159 |
| 5,216,604 | 6/1993 | Sakata et al. | 395/792 |
| 5,261,040 | 11/1993 | Suzuki | 395/772 |
| 5,421,012 | 5/1995 | Khoyi et al. | 395/677 |
| 5,644,692 | 7/1997 | Eick | 395/326 |

FOREIGN PATENT DOCUMENTS 0551696   7/1993   European Pat. Off. .

OTHER PUBLICATIONS

Communications of the Association for Computing Machinery, vol. 33, No. 3, Mar. 1990, New York US, pp. 296–310, XP000161627, Nielsen J.: "The Art of Navigating Hypertext", p. 302, Right–hand col., line 6, –p. 304, Left–hand col., line 5.

Patent Abstracts of Japan, vol. 017, No. 677 (P–1659, Dec. 13, 1993 & JP–A–05 225037 (Fuji Xerox Co Ltd), Sep. 3, 1993.

Sigmod Record, vol. 22, No. 4, Dec. 1993, New York US, pp. 19–25, XP000453416, Wiil U.K.: "Experiences with HyperBase: A Hypertext Database Supporting Collaborative Work", p. 22, left–hand col., line 1–line 39.

Patent Abstracts of Japan, vol. 016, No. 102, (P–1324), Mar. 12, 1992 & JP–A–03 278245 (Fuji Xerox Co. Ltd), Dec. 9, 1991.

Sharing Perspectives, Toronto, Oct. 31 –Nov. 4, 1992, No. –, Oct. 1992, Turner J; Kraut J, pp. 138–146, P000337575, Haake J M et al: "Supporting Collaborative Writing of Hyperdocuments in Sepia".

*Primary Examiner*—Mark R. Powell
*Attorney, Agent, or Firm*—Fitzpatrick, Cella, Harper & Scinto

[57] ABSTRACT

In a display of a hyper text, a hysteresis of an access to a reference file is stored into an access hysteresis file together with attribute information of the reference file. On the basis of the hysteresis of the access stored in the access hysteresis file, the presence or absence of the access to the file on the reference destination side corresponding to each link is judged. With respect to the reference file which was judged such that there was the access, on the basis of the attribute information stored in the access hysteresis file, a variation after the access of the reference file is detected. A link corresponding to the reference file is displayed in a display form according to the detected variation in a manner such that the presence or absence of the access which was judged can be discriminated. Thus, in a hyper text system, the user can recognize the variation after the access of the reference file which was accessed before.

12 Claims, 10 Drawing Sheets

GRADATION OF DISPLAY COLOR = $a\sqrt{\text{VARIATION AMOUNT}}$ a : CONSTANT

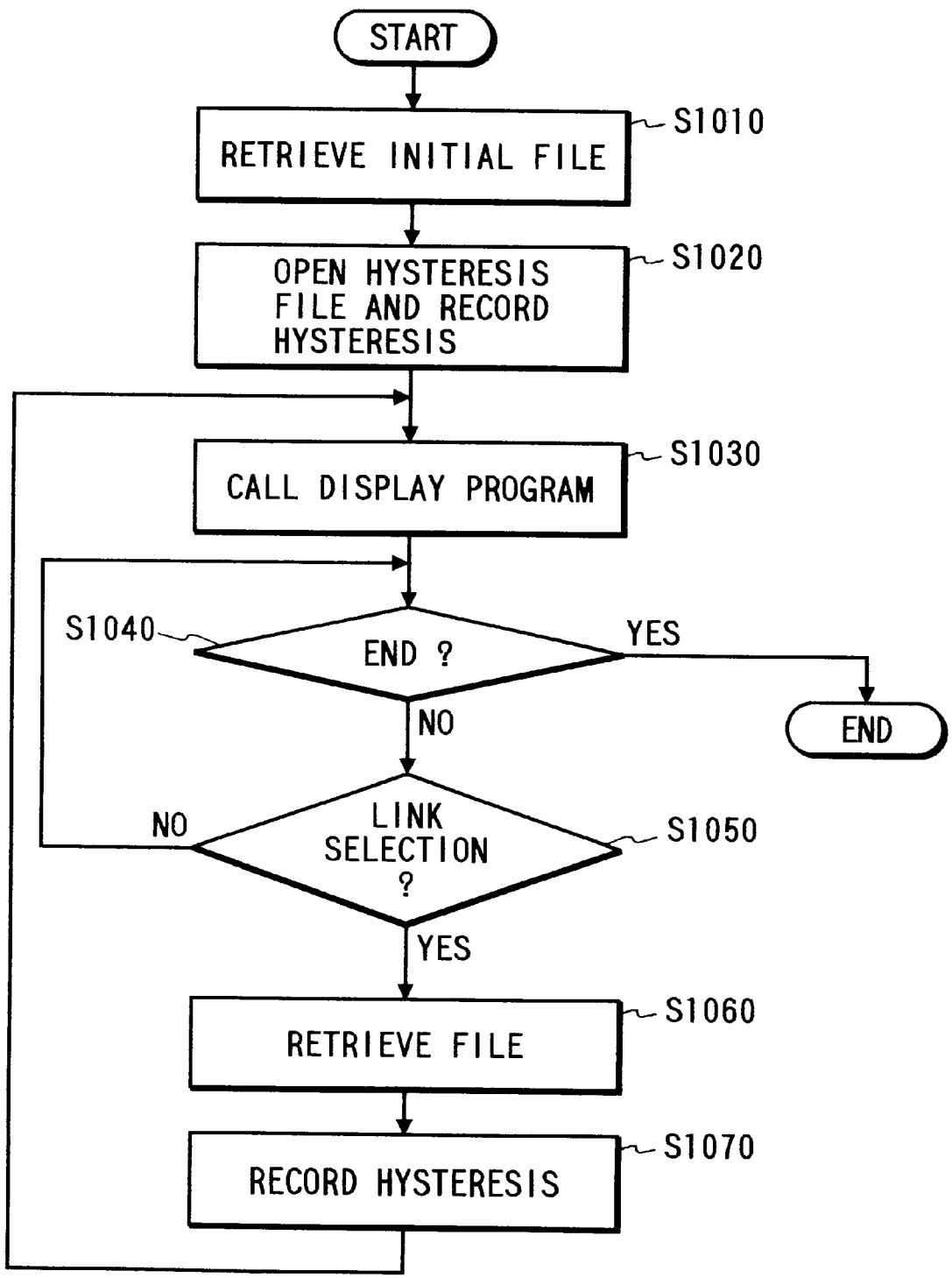

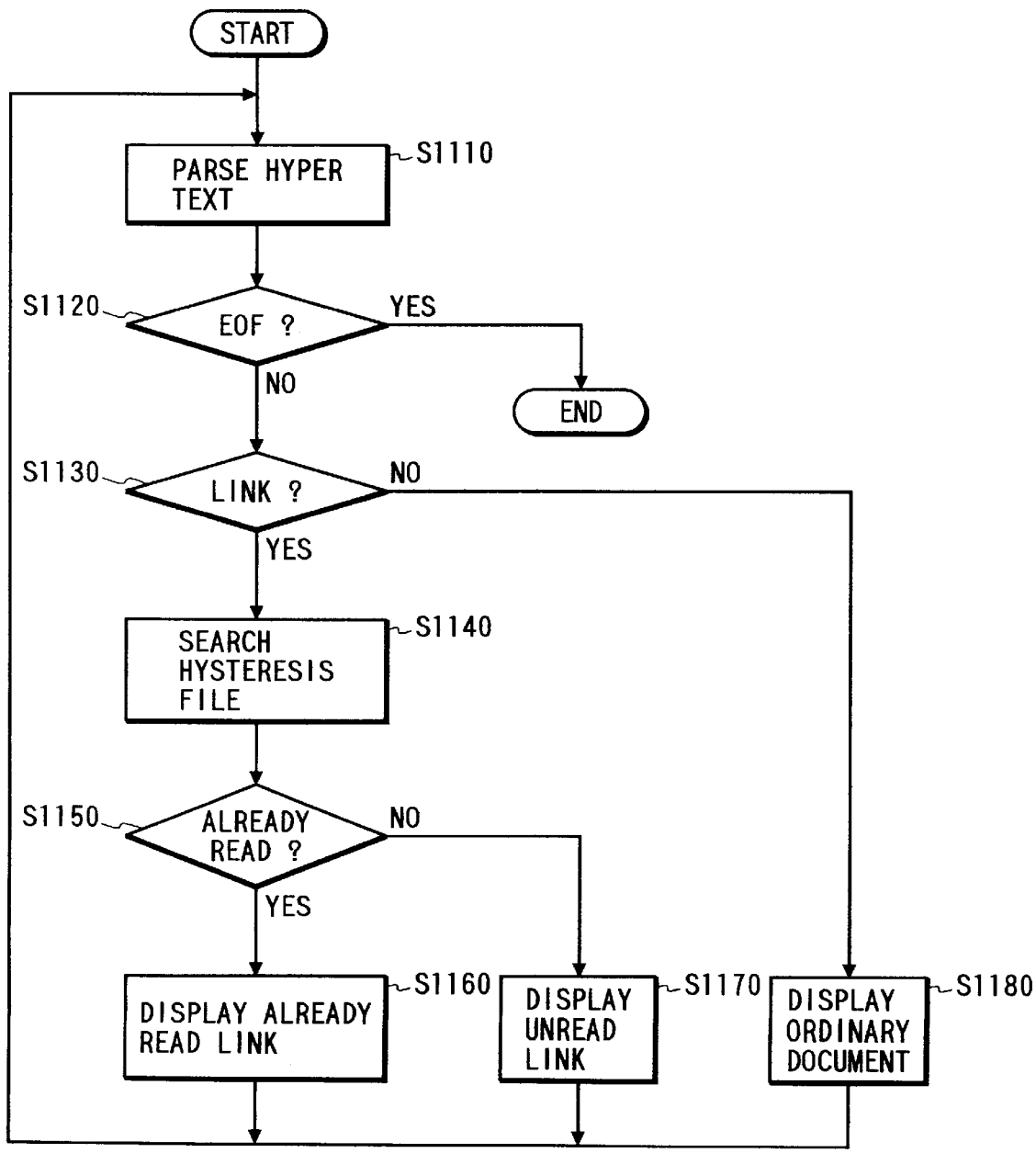

HYPER TEXT SYSTEM AND ITS DISPLAY METHOD

BACKGROUND OF THE INVENTION

1. Field of the Invention

The invention relates to a system for handling a hyper text and its display method.

2. Related Background Art

It is a general way that a reference to another document, figure, table, or the like is included in one document. In a document file on a computer, a "hyper text" in which a function for retrieving and displaying a reference file by the operation of the user is built in is realized in a portion to refer to another document file or a data file such as figure, table, or the like.

FIG. 9 shows an example of a construction of a conventional system for handling such a hyper text. In the diagram, a computer system 110 is constructed by an output device 111, an input device 112, a central processing unit (CPU) 113, a network interface (I/F) device 114, a main memory device 115, a secondary memory device 116, and an internal bus 117, which will be explained hereinbelow.

The output device 111 comprises a display device such as CRT, LCD, or the like, a speaker, a printer, and the like. The input device 112 comprises a keyboard, a mouse, a microphone, and the like. The CPU 113 makes the computer 110 operative in accordance with programs stored in the main memory device 115. The network I/F device 114 is connected to a network communication path 118 in the outside of the computer and communicates with another computer 110' which is connected to the communication path 118 and has a construction similar to the computer 110.

A program 130 to process the hyper text and a program 140 which is called from the program 130 and is used to display the hyper text have been stored in the main memory device 115. The secondary memory device 116 comprises a hard disk, a magneto-optic disk, or the like. A hyper text file 160 and a hysteresis file 170 are stored in the secondary memory device 116. The hyper text file can be stored in not only the own computer 110 but also a memory device of the other computer 110' through a network. The internal bus 117 connects each of the above-mentioned devices 111 to 116 in the computer.

In the hyper text, a document file/data file on the reference destination side may be also further a hyper text. Moreover, in many cases, a plurality of hyper texts refer to one document/data file or a plurality of hyper texts refer to one another. As a whole, it is a general case where the hyper text doesn't have a linear construction like a book.

Therefore, it is difficult for the user to store information indicating which document/data file he has already read. It is, accordingly, necessary to record information indicating which document/data file the user has read and to present the information to the user. The operations of the hyper text process program 130 and display program 140 will now be described hereinbelow with reference to FIGS. 10 and 11.

The hyper text process program 130 will now be described.

First, The initial hyper text file 160 which is designated by the user is retrieved from the secondary memory device 116 or a secondary memory device of the other computer 110' through the network (step S1010). Subsequently, the hysteresis file 170 of each user is opened (if there is no hysteresis file, after it was formed, it is opened) and reference destination information of the initial file is recorded to the end of file (step S1020).

In step S1030, the hyper text display program 140 is called and the retrieved document/data file is displayed by the output device 111. The display program 140 will be described in detail hereinlater with reference to FIG. 11.

Returning from the display program 140, a check is made to see if the user has performed an end procedure of the processes (step S1040). If YES, the processing routine is finished.

When the end procedure is not performed, step S1050 follows and the apparatus waits until the user selects a link by the operation of the input device 112 such as keyboard, mouse, or the like. When no link is selected, the processing routine is returned to step S1040. When the link is selected, the processing routine advances to step S1060 of retrieving the file.

In step S1060, reference destination information (hereinafter, simply referred to as reference information) indicative of the position of the file which is referred from the link is extracted. On the basis of the reference information, the document data/file is retrieved from the secondary memory device 116 or a secondary memory device of the other computer 110' through the network. In step S1070, further, the reference information of the file which was retrieved in step S1060 is recorded to the end of the hysteresis file 170. The processing routine is returned to step S1030, the display program 140 is called, the contents thereof are displayed on the output device 111, and the above processes are subsequently repeated until the end of the processing routine.

The information of the link selected by the user, namely, the file read by the user is recorded in steps S1020 and S1070 mentioned above.

Subsequently, the program 140 for distinguishing the unread portion and the already read portion of the user on the basis of the hysteresis and for displaying the hyper text will now be described with reference to FIG. 11.

First, the hyper text file is parsed (step S1110). In step S1120, a check is made to see if a processing position has reached the end of the file. If NO, step S1130 follows. If YES, the processing routine is finished.

In step S1130, a check is made to see if the parsed portion is a reference portion (link anchor) to another file. When it is not the link, an ordinary document display is performed (step S1180). For example, characters are displayed by a black font of Ming type and no decoration is performed to the characters.

In case of the link, step S1140 follows and the reference information of the link is extracted and a check is made to see if the reference information of the link has been recorded in the hysteresis file 170 of the user (step S1150). If NO, since this means that the document/data file designated by the link is not read yet, an unread link display is performed (step S1170). For example, characters are displayed by a blue font of Gothic type and a decoration such that the characters are underlined or the like is performed.

In step S1150, when the reference information has been recorded, the file designated by the link has already been read, so that the already read link display is performed (step S1160). For example, characters are displayed by a red font of Gothic type and a decoration such that the characters are underlined by a broken line or the like is performed. After completion of steps S1160, S1170, and S1180, the processing routine is returned to step S1110 and the processing routine is repeated until the end.

According to the above processes, the link to the document/data file which has already been read by the user and the link to the document/data file which is not read yet are distinguished.

However, in the case where the already read file is renewed after it was read, the contents of the file after it was renewed are not read. Therefore, although such a state is substantially equivalent to the unread state, since this point is not reflected to the hysteresis file, the link is uniformly displayed as an already read file. A problem such that the file to be again confirmed and the file which has already been confirmed cannot be distinguished occurs.

SUMMARY OF THE INVENTION

It is, therefore, an object of the invention to provide a hyper text system and a display method, in which whether an already read file has been renewed after it was read or not can be discriminated.

According to one aspect, the present invention which achieves these objectives relates to a hyper text system in which when a file is displayed, a link to a reference file is displayed and the reference file corresponding to the link is called from a file memory unit and is displayed by an instruction, comprising: access hysteresis memory means for storing a hysteresis of an access to the reference file together with attribute information of the reference file; judging means for judging the presence or absence of the access to the file on the reference destination side corresponding to each link on the basis of the hysteresis of the access stored in the access hysteresis memory means; detecting means for detecting a variation of the reference file after completion of the access on the basis of the attribute information stored in the access hysteresis memory means with respect to the reference file which was judged by the judging means such that there was the access; and display control means for displaying the link corresponding to the reference file in a display form according to the variation detected by the detecting means in a manner such that the presence or absence of the access which was judged by the judging means can be discriminated.

According to another aspect, the present invention which achieves these objectives relates to a display method of a hyper text system in which when a file is displayed, a link to a reference file is displayed and the reference file corresponding to the link is called from a file memory unit and is displayed by an instruction, comprising: a hysteresis memory step of storing a hysteresis of an access to the reference file into an access hysteresis file together with attribute information of the reference file; a judging step of judging the presence or absence of an access to a file on the reference destination side corresponding to each link on the basis of the hysteresis of the access stored in the access hysteresis file; a detecting step of detecting a variation in the reference file after completion of the access on the basis of the attribute information stored in the access hysteresis file with respect to the reference file which was judged by the judging step such that there was the access; and a display control step of displaying the link corresponding to the reference file in a display form according to the variation detected by the detecting step in a manner such that the presence or absence of the access which was judged by the judging step can be discriminated.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 10 is a flowchart for the operation of a conventional hyper text process program; and FIG. 11 is a flowchart for the operation of a conventional hyper text display program.

DETAILED DESCRIPTION OF THE PREFERRED EMBODIMENTS

A preferred embodiment according to the invention will now be described in detail hereinbelow with reference to the drawings.

[Embodiment 1]

Figure 1:
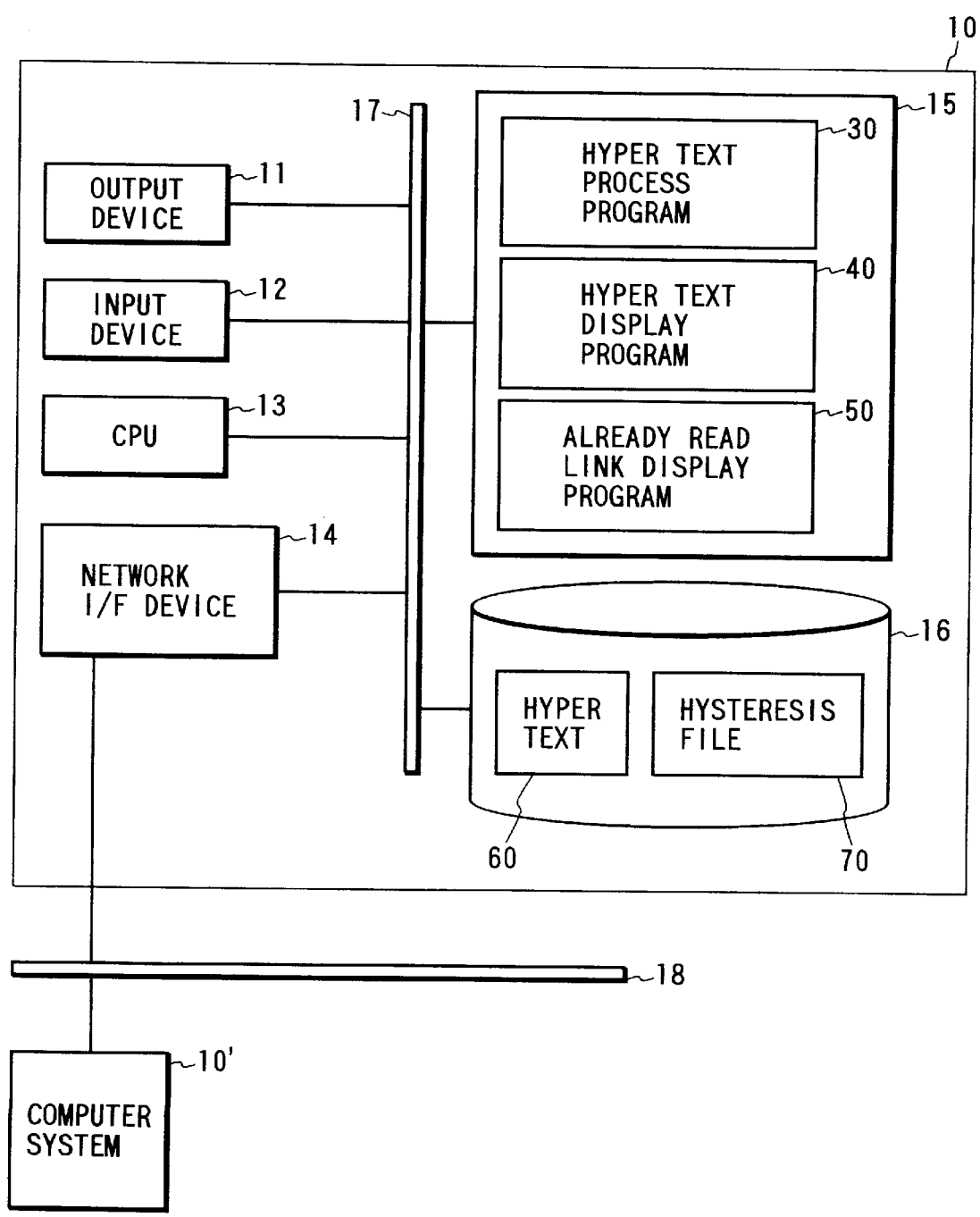
FIG. 1 is a block constructional diagram of a computer system of an embodiment.
Figure 9:
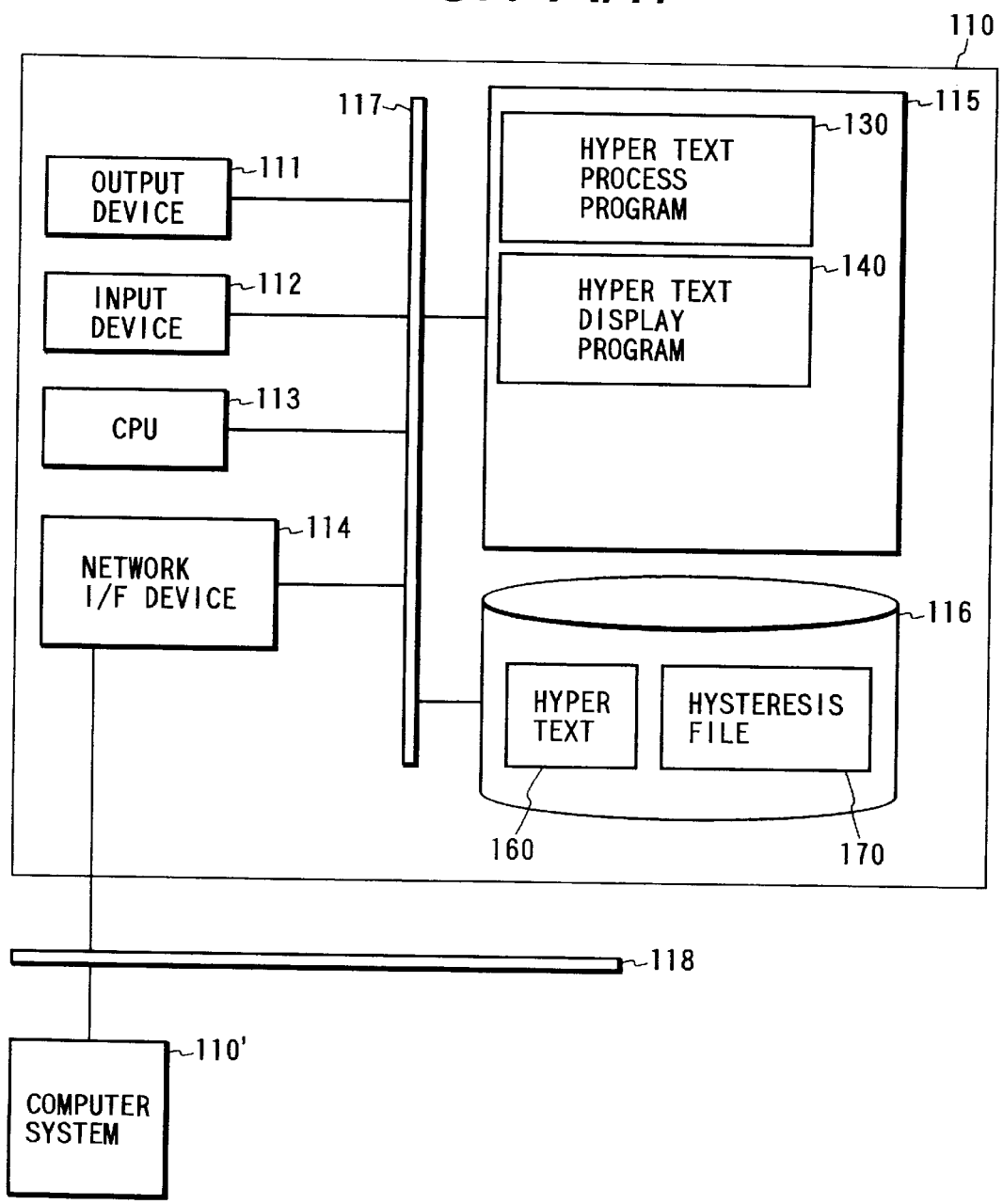
FIG. 9 is a diagram of a construction of a conventional system.

FIG. 1 shows an example of a system construction to realize the embodiment. In the diagram, a computer system 10, an output device 11, an input device 12, a central processing unit (CPU) 13, a network interface device 14, a main memory device 15, a secondary memory device 16, an internal bus 17, and a network communication path 18 correspond to the computer system 110, output device 111, input device 112, central processing unit (CPU) 113; network interface device 114, main memory device 115, secondary memory device 116, internal bus 117, and network communication path 118 in the conventional system of FIG. 9, respectively. Forms of a hyper text file 60 and a hysteresis file 70 differ from forms of the conventional hyper text file 160 and hysteresis file 170. A hyper text process program 30 in the embodiment, a hyper text display program 40 in the embodiment, and an already read link display program 50 in the embodiment have been stored in the main memory device 15.

The operation of the hyper text process program 30 will now be described with reference to FIGS. 2, 3, and 4.

Figure 2:
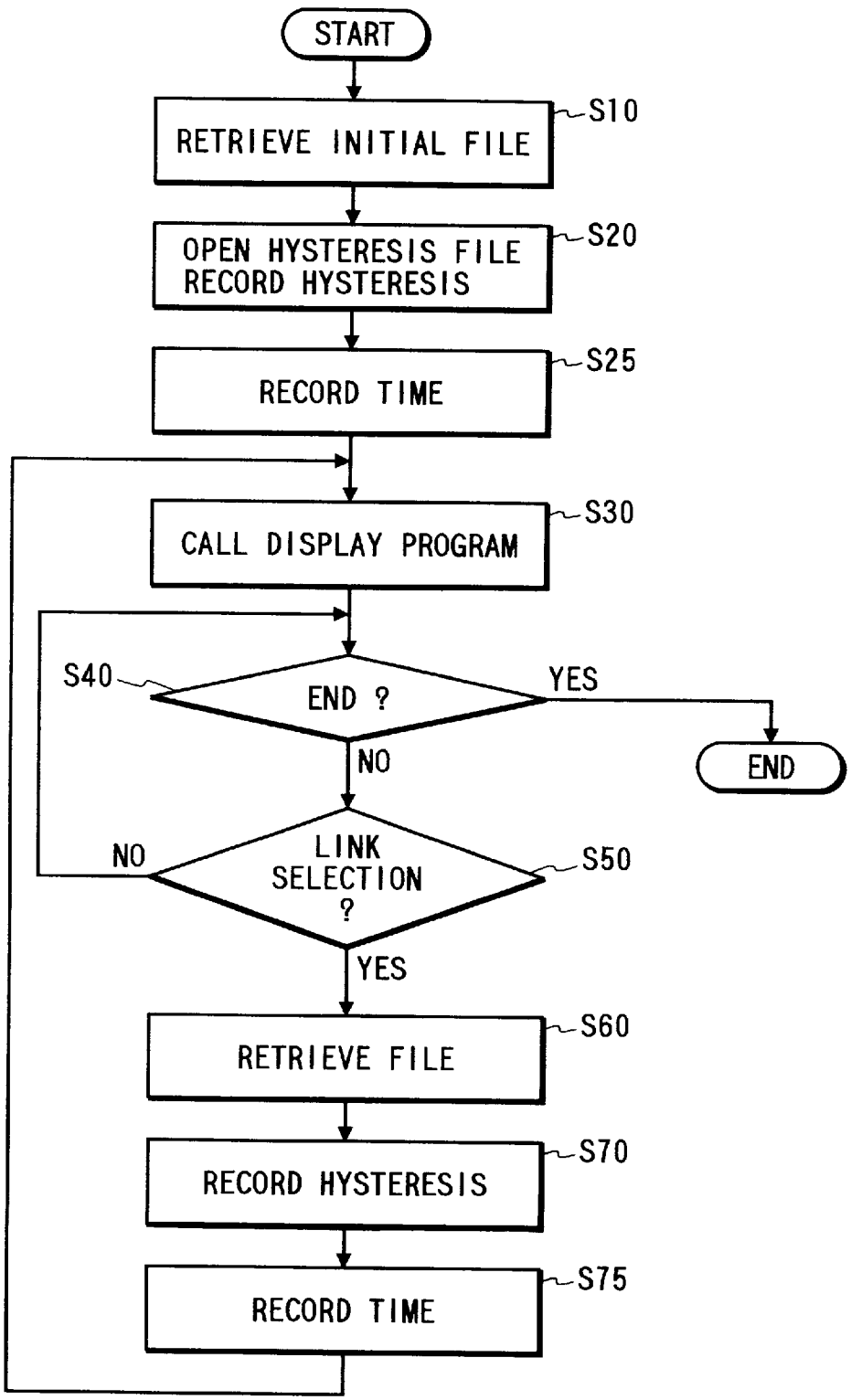
FIG. 2 is a flowchart for the operation of a hyper text process program according to the first embodiment.

FIG. 2 shows the operation of the hyper text processing program 30. Steps S10 to S70 correspond to steps S1010 to S1070 in the conventional processes in FIG. 10. Further, steps S25 and S75 which don't exist in the conventional hyper text process program 130 are added just after steps S20 and S70, respectively.

Steps S25 and S75 are the same process and are steps of recording a time at that time into the hysteresis file 70 subsequent to reference information recorded in the hysteresis file 70 in the step just before. Thus, the time at which a link was selected is recorded. It is considered that this time is the time at which the user reads a document/data file. Such a time is hereinafter called an access time to the file.

Figure 3:
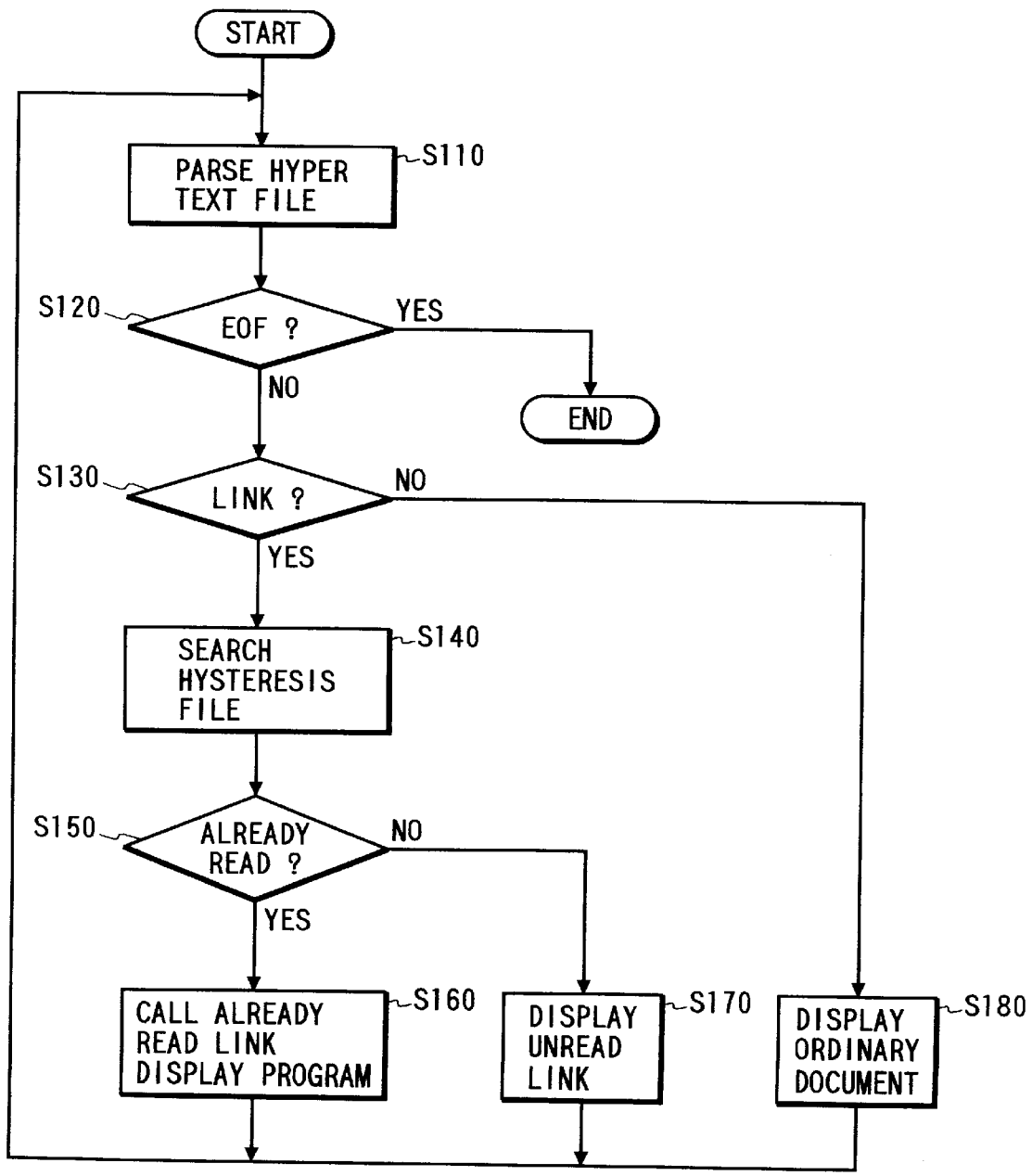
FIG. 3 is a flowchart for the operation of a hyper text display program in the first embodiment.
Figure 4:
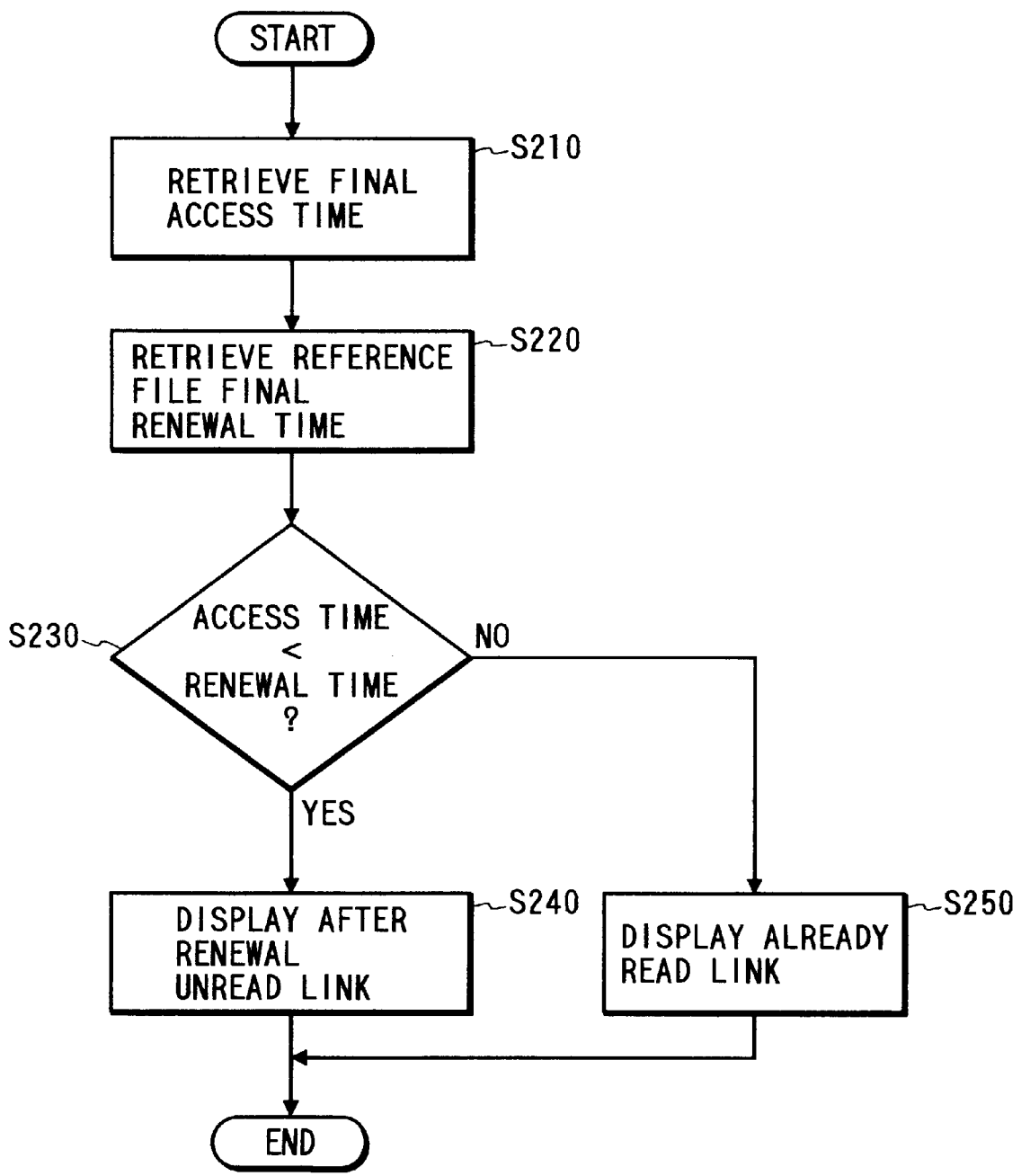
FIG. 4 is a flowchart for the operation of an already read link display program in the first embodiment.

FIG. 3 shows the operation of the hyper text display program 40. Steps S110 to S180 correspond to steps S1110 to S1180 of the operation of the conventional hyper text display program 140 in FIG. 11, respectively. In step S160 in FIG. 3, the already read link display program 50 that is peculiar to the embodiment is called in place of calling an already read link display program in already read link display step S1160 in FIG. 11.

The operation of the already read link display program 50 will now be described hereinbelow with reference to FIG. 4. First, a newest (final) access time among the access times for the hysteresis file is retrieved from the hysteresis file (step S210). Subsequently, a final renewal time of the file is retrieved from the secondary memory device 16 or the secondary memory device of the other computer 101 through the network (step S220). The retrieved final renewal time is compared with the final access time (step S230). When the final access time is newer, an already read link display similar to step S1160 is executed (step S250). The processing routine is finished.

The case where the final renewal time is newer corresponds to the case where after the file was finally read, its contents have been renewed. Therefore, after completion of the renewal, an unread link display is performed (step S240). The processing routine is finished. In the unread link display after the renewal, characters are displayed in a display form different from those in the unread link display and, further, in the already read link display, for example, the characters are displayed in a green font of gothic type and a decoration such that the characters are underlined by an alternate long and two-short dashes line or the like is performed.

In the embodiment, a fact that the document/data file which had already been accessed and read was renewed after that and its contents were changed is clearly shown to the user, so that there is an effect such that a dropout of the file to be confirmed is eliminated.

[Embodiment 2]

The embodiment relates to the improvement of the display method of the unread link after the renewal in the first embodiment.

A system construction to realize the embodiment is also the same as that in FIG. 1 used in the description of the first embodiment. However, the hyper text process program 30, display program 40, and already read link display program 50 in FIG. 1 are replaced to a hyper text process program 31, a hyper text display program 41, and an already read link display program 51 (those programs are not shown) which are peculiar to the embodiment, respectively. The hysteresis file 70 is replaced to a hysteresis file 71 of a form peculiar to the embodiment.

Although the operation of the embodiment is fundamentally similar to the operation of the first embodiment, a function for recording a size of file into a hysteresis file and for using in a display process is added. This point will now be described with reference to FIGS. 5 and 6 while partially exchanging FIG. 3.

Figure 5:
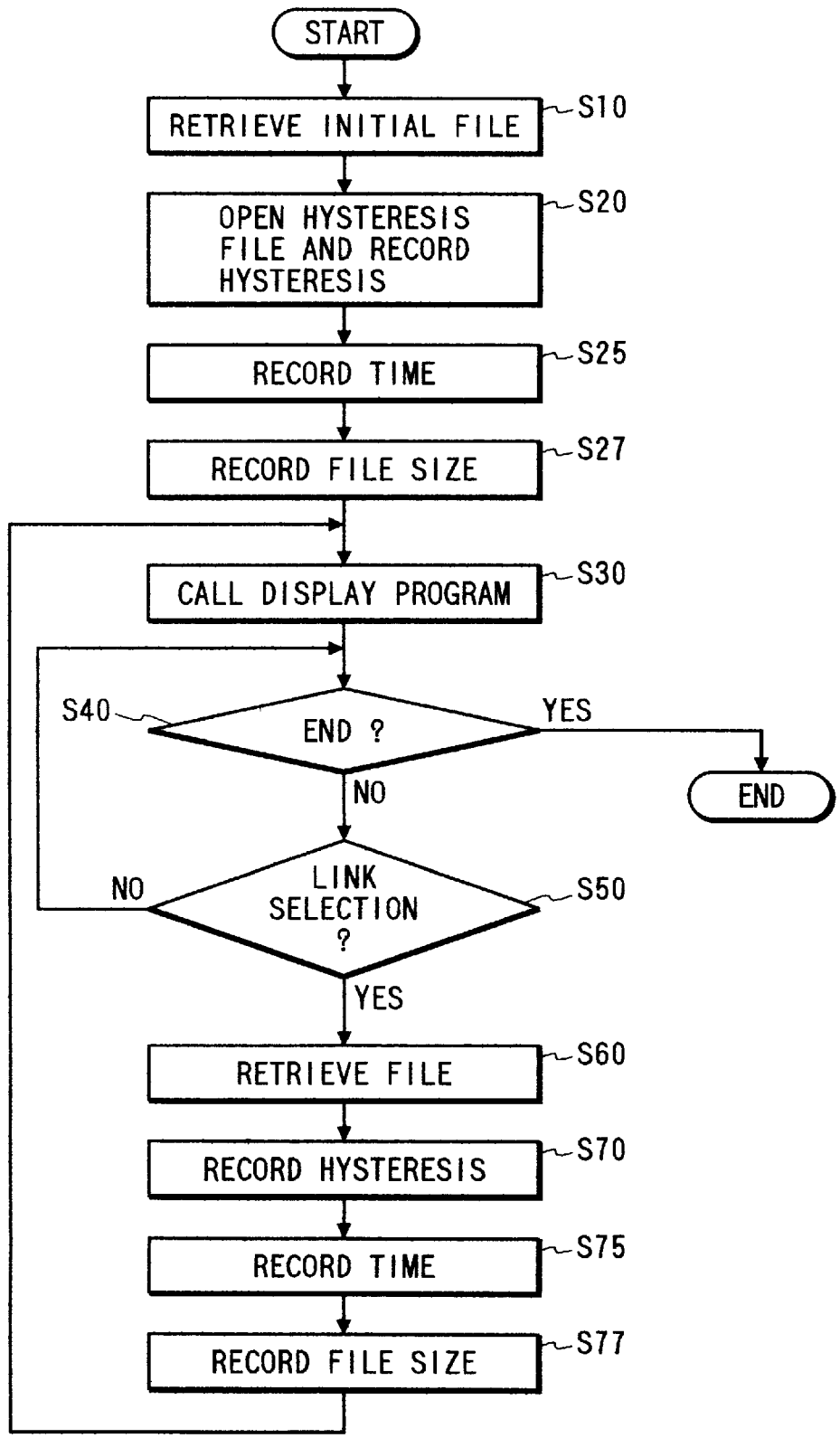
FIG. 5 is a flowchart for the operation of the hyper text process program in the first embodiment.

The operation of the hyper text process program 31 is shown in FIG. 5. The operation corresponds to the case where steps S27 and S77 are inserted just after steps S25 and S75 in the hyper text process program 30 shown in FIG. 2. Since processing steps other than steps S27 and S77 are substantially the same as those in the first embodiment, their descriptions are omitted.

The same process is executed in steps S27 and S77. In these steps, a size (the number of bytes) of the document/data file obtained by the retrieval is recorded into the hysteresis file 71 subsequent to the reference information and the access time. Thus, in addition to the time of the selection of the link, the size of file referred at that time point is recorded into the hysteresis file 71.

The operation of the hyper text display program 41 corresponds to that in the operation of the hyper text display program 40 shown in FIG. 3, step S160 to call the already read link display program 50 is replaced to step S162 (not shown) to call the already read link display program 51 in the embodiment.

Figure 6:
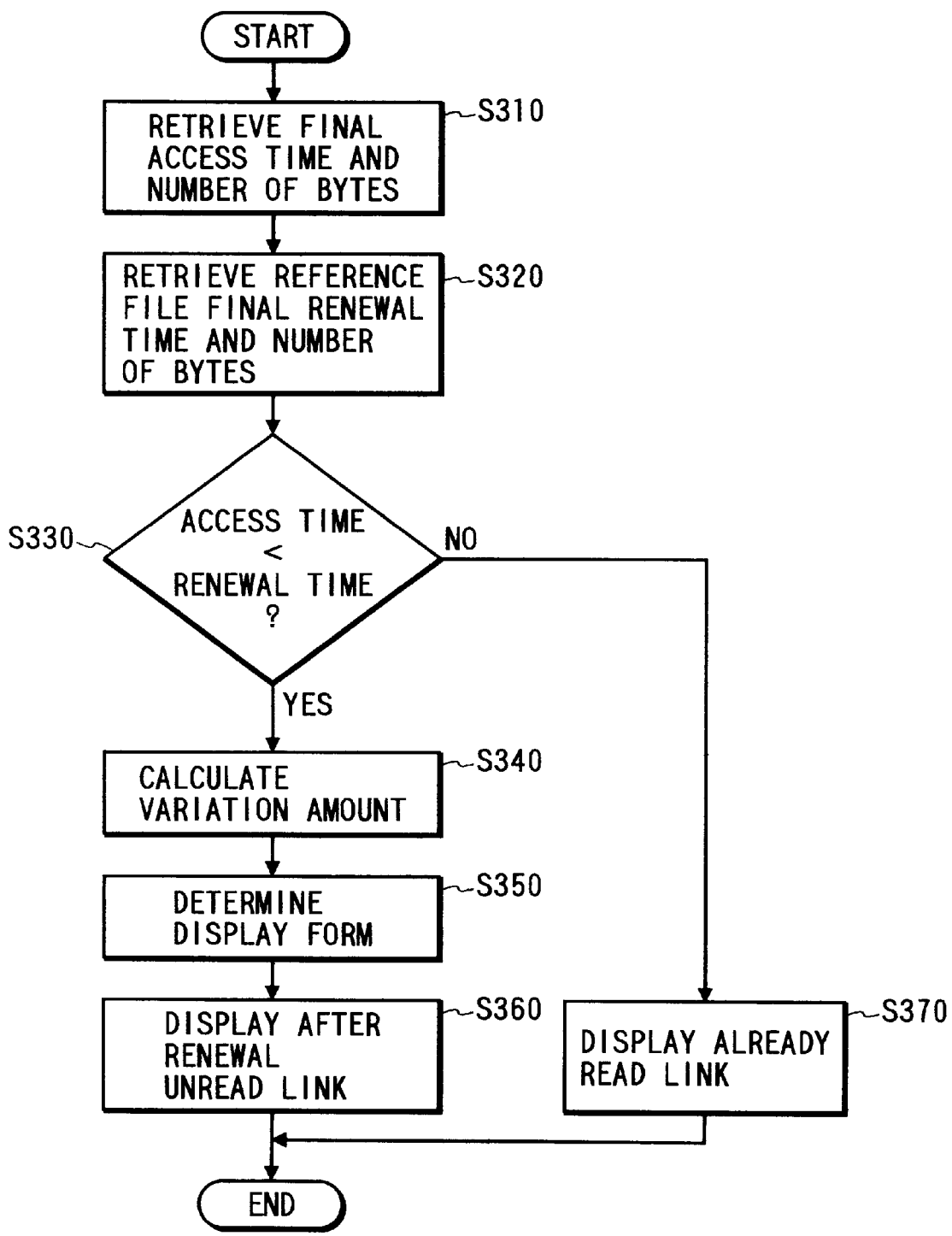
FIG. 6 is a flowchart for the operation of an already read link display program according to the second embodiment.

The operation of the already read link display program 51 will now be described with reference to FIG. 6. First, the final access time and the size of file at that time point are read out from the hysteresis file 71 (step S310). Subsequently, the final renewal time of the hyper text file 60 on the reference destination side and the size of file at that time point, namely, at present are retrieved from the secondary memory device 16 or the secondary memory device of the other computer 10' through the network 18 (step S320). The final renewal time and the final access time are compared (step S330). When the final access time is newer, an already read link display similar to step S1160 is executed (step S370). The processing routine is finished.

The case where the final renewal time is newer corresponds to the case where after the file had finally been read, its contents were renewed. A variation amount of the files before and after the renewal is calculated (step S340). Although it is an easy way to use an absolute value of a difference between the file size at the time of the final access and the present file size, the variation amount can be also calculated by using an arbitrary function such that a ratio of the sizes is obtained or the like.

Figure 7:
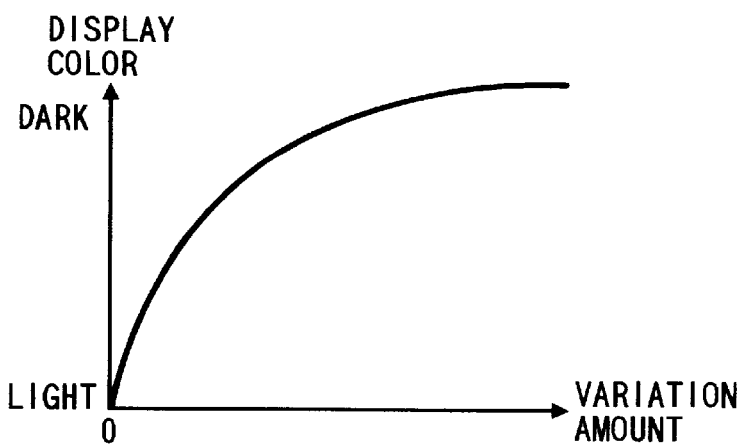
FIG. 7 is a diagram showing an example of a function which is used in the second embodiment.

In step S340, a display form of the unread link display after the renewal is determined on the basis of the calculated variation amount (step S350). For example, the variation amount is mapped to a gradation of the display color of the unread link after the renewal by using a proper function. An example of the function for this purpose is shown in FIG. 7. The invention is not limited to such a function but a magnitude of the variation amount can be expressed by the gradation of the display color by using a monotonous function. The variation amount can be also mapped into a gradation of a painting with a dot pattern to the characters, an interval of the broken line of the underline, or the like instead of the gradation of the display color of the characters.

In step S350, the unread link display after the renewal is performed in the determined display form (step S360). The processing routine is finished.

In the embodiment, in addition to the effect in the first embodiment such that whether the already read file as a reference destination of the link has been renewed or not can be discriminated, there is an effect such that a degree of the renewal of the already read file which has been renewed can be also discriminated.

By displaying such a degree of renewal, there is an effect such that the user can use such a degree as a reference when judging whether he again executes an access to the reference destination or not or when deciding the priority of the re-access.

Namely, in the renewal of about a few bytes, a possibility such that it is a renewal of a degree such that erroneous characters or a dropout of characters are corrected is high, and it is possible to judge that the re-access is unnecessary or a necessity to rapidly re-access is small. On the other hand, in case of the renewal of about hundreds of bytes, since a correction on a paragraph unit basis is considered, it is possible to judge that a degree of necessity of the re-access is high. It is useful to decide the priority of the reaccess.

[Embodiment 3]

The embodiment intends to easily realize the function of the first embodiment.

A system construction to realize the embodiment is similar to that in FIG. 1 used for the description of the first embodiment. However, the hyper text display program 40 and already read link display program 50 are replaced to a hyper text display program 42 and an already read link display program 52 (these programs are not shown) which are peculiar to the embodiment, respectively.

The operation of the embodiment is fundamentally the same as the operation of the first embodiment. Only the operations of the hyper text display program 42 and already read link display program 52 will now be described with reference to FIG. 8 while partially exchanging FIG. 3.

As for the operation of the hyper text display program 42, in the operation of the hyper text display program 40 shown in FIG. 3, step S160 of calling the already read link display program 50 is replaced to step S165 (not shown) of calling the already read link display program 52 in the embodiment.

Figure 8:
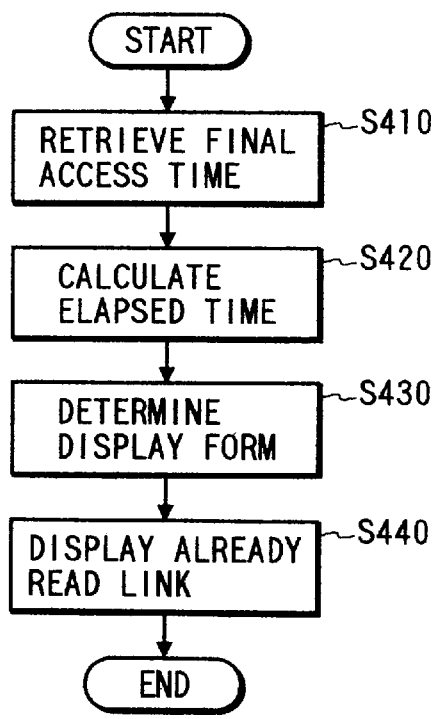
FIG. 8 is a flowchart for the operation of an already read link display program according to the third embodiment.

The operation of the already read link display program 52 will now be described hereinbelow with reference to FIG. 8. First, the final access time among the access times of the hysteresis file is retrieved from the hysteresis file 70 (step S410). Subsequently, the final access time obtained in step S410 is subtracted from the present time, thereby obtaining the elapsed time from the final access (step S420). On the basis of the elapsed time, a display form of the already read link display is determined (step S430). For example, the elapsed time is mapped into a gradation of the display color of the already read link by using a proper function in a manner similar to the variation amount of the file size in the second embodiment. In place of the gradation of the display color, the elapsed time can be also mapped into a gradation of a painting with a dot pattern to characters, an interval of the broken lines of the underline, or the like.

In step S430, the already read link display is performed in the decided display form (step S440). The processing routine is finished.

In the embodiment, in the display of the link, since there is no need to retrieve additional information from the file on the reference destination side, particularly, in the case where the file on the reference destination side is put on another computer connected through the network, a load of the communicating process is reduced and a processing speed is improved.

Since a degree of the elapsed time from the final access is shown to the user, there is an effect such that such a degree of the elapsed time becomes a reference when the user decides the priority of the reaccess. For example, in case of a file that is periodically renewed, the presence or absence of the renewal of the file can be easily presumed from the elapsed time from the final access.

The link display according to the embodiment can be also combined with the link display in the second embodiment. In this case, two expressing methods are enabled to be discriminated in a manner such that a magnitude of the variation amount in the second embodiment is expressed by a gradation of the display color of the characters and a duration of the elapsed time in the embodiment is expressed by a decoration of characters, for example, by dense or coarse of the interval of the broken line of the underline, or the like.

In the hyper text system described above, by using the means for retrieving information other than the contents of the file such as a final renewal time or the like of the file on the reference destination side of the link, means for adding the additional information such as time information or the like in addition to the reference information into the hysteresis file of each user, and means for changing the display method of the already read link on the basis of the additional information of the hysteresis file, a warning indicating that the already read file has been renewed after that or there is a possibility of such a situation can be notified to the user.

The invention described above can be applied to a system constructed by a plurality of computers or a specific computer in the system. The invention can be applied to the case where it is accomplished by executing a program by the computer. The program can be also supplied from a memory medium in the outside. The memory medium to store the program is also incorporated in the scope of the invention.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A hyper text system in which, when a file is displayed, a link to a reference file is displayed and the reference file corresponding to the link is called from a file memory unit and is displayed by an instruction, comprising:

access means for accessing each reference file corresponding to each link;

access hysteresis memory means for storing hysteresis information of each access to a reference file by said access means, including an access time of that access;

judging means for judging, for each link, whether or not the respective reference file has been accessed by said access means, on the basis of the hysteresis information stored in said access hysteresis memory means;

retrieving means for retrieving a most recent update time from the file memory unit corresponding to one of the reference files if the one reference file was judged to have been accessed by said judging means;

determining means for determining whether or not each of the reference files which were judged to have been accessed was updated after a most recent access to that file by comparing, corresponding to the respective reference file, the retrieved most recent update time with the access time for the most recent access stored in said access hysteresis memory means; and display control means for displaying each link in a display form that enables operator discrimination between a link corresponding to a reference file that has not been accessed, a link corresponding to a reference file that was accessed and updated after such access, and a link corresponding to a reference file which was accessed and was not updated after such access.

2. A system according to claim 1, further comprising detecting means for detecting, for each reference file that was updated, a time elapsed from the most recent access of that reference file to the update of that reference file on the basis of a difference between the retrieved renewal time and the access time of the most recent access of that reference file stored in said access hysteresis memory means, wherein said display control means further displays each link corresponding to a reference file which was accessed and updated in a display form according to the respective elapsed time detected by said detecting means.

3. A system according to claim 1, further comprising file size memory control means for storing a size of an accessed file into said access hysteresis memory means as part of the hysteresis information with the access time.

4. A system according to claim 3, wherein said file memory unit stores a present file size of the accessed reference file, and said retrieving means retrieves the respective present file size from said file memory unit for each reference file which was judged to have been accessed by said judging means, said system further comprising size variation detecting means for comparing the retrieved present file size with the size of the accessed file stored in said access hysteresis memory means, and for detecting a variation of file size after the access of the accessed reference file.

5. A system according to claim 4, wherein said display control means displays each link corresponding to an accessed reference file in a display form according to the variation of file size detected by said detecting means.

6. A hyper text system in which, when a file is displayed, a link to a reference file is displayed and the reference file corresponding to the link is called from a file memory unit and is displayed by an instruction, comprising:

access means for accessing each reference file corresponding to each link;

access hysteresis memory means for storing hysteresis information of each access to a reference file by said access means, including an access time of that access;

judging means for judging, for each link, whether or not the respective reference file has been accessed by said access means on the basis of the hysteresis information stored in said access hysteresis memory means;

retrieving means for retrieving a most recent update time from the file memory unit corresponding to one of the reference files if the one reference file was judged to have been accessed by said judging means;

detecting means for detecting an elapsed time from a most recent access to each of the reference files which have been accessed on the basis of a difference between the access time of the most recent access to the respective reference file stored in said hysteresis memory means and the present time; and display control means for displaying each link in a display form that enables operator discrimination between a link corresponding to a reference file that has not been accessed and a link corresponding to a reference file which was accessed, where the display form of each link corresponding to a reference file that has been accessed is further distinguished according to a length of the respective elapsed time detected by said detecting means.

7. A display method of a hyper text system in which, when a file is displayed, a link to a reference file is displayed and the reference file corresponding to the link is called from a file memory unit and is displayed by an instruction, said method comprising:

an access step of accessing each reference file corresponding to each link;

an access hysteresis memory step of storing, in an access hysteresis memory means, hysteresis information of each access to a reference file in said access step, including an access time of that access;

a judging step of judging, for each link, whether or not the respective reference file has been accessed in said access step, on the basis of the hysteresis information stored in the access hysteresis memory means;

a retrieving step of retrieving a most recent update time from the file memory unit corresponding to one of the reference files if the one reference file was judged to have been accessed in said judging step;

a determining step of determining whether or not each of the reference files which were judged to have been accessed was updated after a most recent access to that file by comparing, corresponding to the respective reference file, the retrieved most recent update time with the access time for the most recent access stored in the access hysteresis memory means; and a display control step of displaying each link in a display form that enables operator discrimination between a link corresponding to a reference file that has not been accessed, a link corresponding to a reference file that was accessed and updated after such access, and a link corresponding to a reference file which was accessed and was not updated after such access.

8. A method according to claim 7, further comprising a detecting step of detecting, for each reference file that was updated, a time elapsed from the most recent access of that reference file to the update of that reference file on the basis of a difference between the retrieved renewal time and the access time of the most recent access of that reference file stored in the access hysteresis memory means, wherein said display control means further displays each link corresponding to a reference file which was accessed and updated in a display form according to the respective elapsed time detected by said detecting step.

9. A method according to claim 7, further comprising a file size memory control step of storing a size of an accessed file into the access hysteresis memory means as part of the hysteresis information with the access time.

10. A method according to claim 9, wherein the file memory unit stores a present file size of the accessed reference file, and said retrieving step retrieves the respective present file size from the file memory unit for each reference file which was judged to have been accessed by said judging step, said system further comprising size variation detecting means for comparing the retrieved present file size with the size of the accessed file stored in the access hysteresis memory means, and for detecting a variation of file size after the access of the accessed reference file.

11. A system according to claim 10, wherein said display control step displays each link corresponding to an accessed reference file in a display form according to the variation of file size detected by said detecting step.

12. A display method of a hyper text system in which, when a file is displayed, a link to a reference file is displayed and the reference file corresponding to the link is called from a file memory unit and is displayed by an instruction, said method comprising:

an access step of accessing each reference file corresponding to each link;

an access hysteresis memory step of storing, in access hysteresis memory means, hysteresis information of each access to a reference file in said access step, including an access time of that access;

a judging step of judging, for each link, whether or not the respective reference file has been accessed in said access step on the basis of the hysteresis information stored in the access hysteresis memory means;

a retrieving step of retrieving a most recent update time from the file memory unit corresponding to one of the reference files if the one reference file was judged to have been accessed in said judging step;

a detecting step of detecting an elapsed time from a most recent access to each of the reference files which have been accessed on the basis of a difference between the access time of the most recent access to the respective reference file stored in the hysteresis memory means and the present time; and a display control step of displaying each link in a display form that enables operator discrimination between a link corresponding to a reference file that has not been accessed and a link corresponding to a reference file which was accessed, where each link corresponding to a reference file that has been accessed is further distinguished according to the respective elapsed time detected in said detecting step.

* * * * *